July 27, 1937.  J. C. McCUNE  2,088,529
MAGNETIC TRACK BRAKE
Filed Dec. 20, 1935
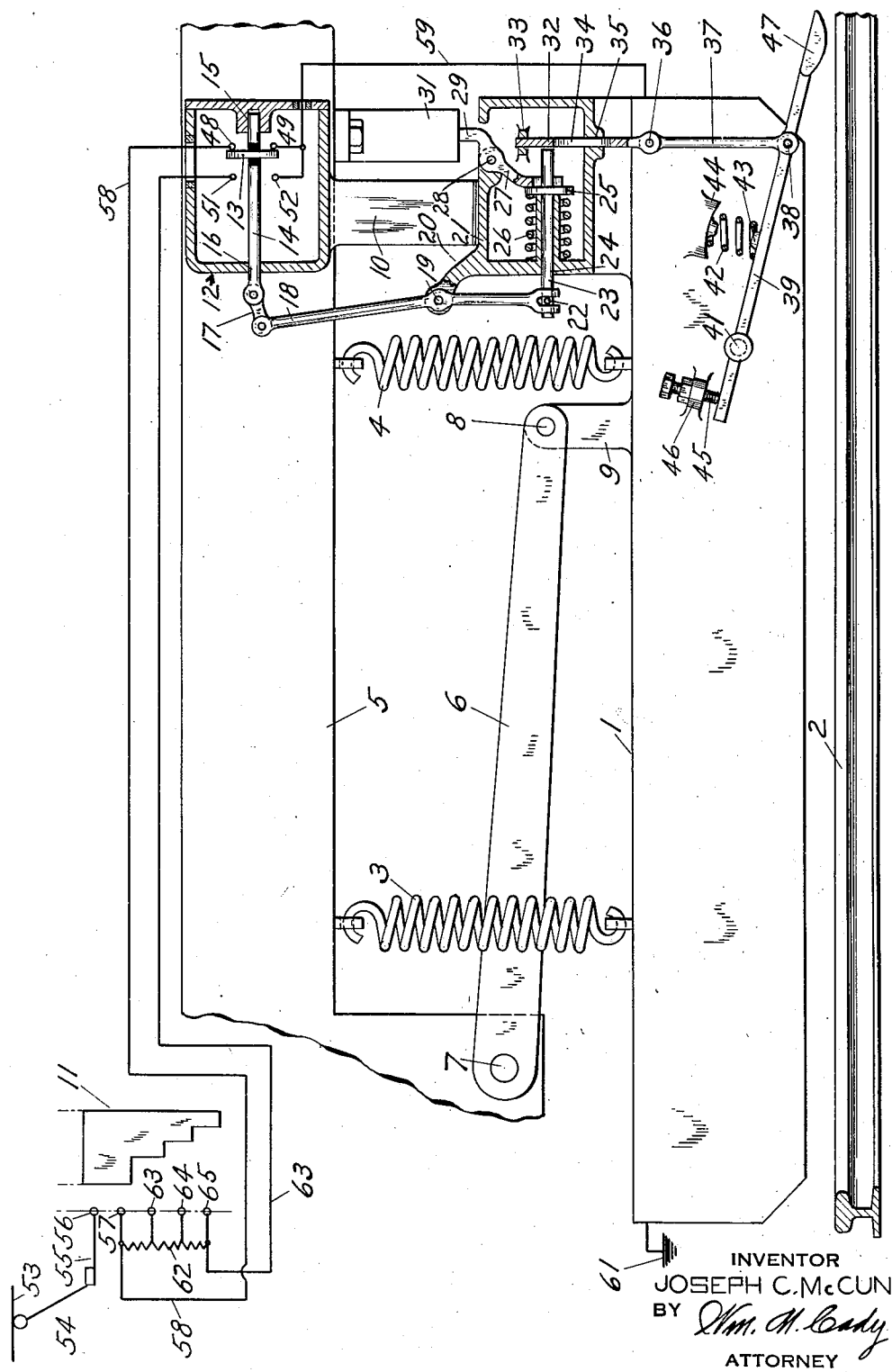
INVENTOR
JOSEPH C. McCUNE
BY Wm. M. Cady
ATTORNEY Patented July 27, 1937

2,088,529

UNITED STATES PATENT OFFICE 2,088,529

MAGNETIC TRACK BRAKE

Joseph C. McCune, Edgewood, Pa., assignor to The Westinghouse Air Brake Company, Wilmerding, Pa., a corporation of Pennsylvania Application December 20, 1935, Serial No. 55,454

13 Claims. (Cl. 188—165)

This invention relates to magnetic brakes for railway trains or vehicles of the type having magnetic track brake shoes adapted to engage the rail and to retard the vehicle by the dragging of the brake shoe on the rail due to the magnetic pull between the brake shoe and the rail.

The principal object of my invention is to provide a magnetic brake of the above indicated type wherein the magnetic track brake shoes are spring supported and pulled into contact with the rail by magnetic forces in such manner as to eliminate objectionable shock to the car due to the sudden increase in braking forces that may obtain at the time the track shoes contact the rail.

Another object of my invention is a provision of means whereby, when the brake controller is moved to a brake applying position, the track shoes will be initially energized to a maximum degree to insure movement thereof into engagement with the track rail and, as the track shoe moves into engagement with the track rail the energization of the track shoe is decreased to a minimum amount, the further control of the energization of the track brake being determined by the position of the brake controller.

Other objects and advantages of my invention will be apparent from the following description of one preferred embodiment thereof taken together with the accompanying drawing forming a part of the specification.

Referring to the drawing, the single figure is a diagrammatic view illustrating one preferred embodiment of my invention and comprising a track shoe magnet 1 suspended above the rail 2 by coil springs 3 and 4, the lower ends of which are connected to the track shoe 1 and the upper ends of which are connected to a portion of the car truck 5, springs 3 and 4 exerting sufficient upward force on the track shoe 1 to normally retain it out of engagement with the track rail 2. A thrust rod 6 is provided having one end connected to the truck 5 by means of a pivot pin 7 and the other end connected to the track shoe 1 by a pin 8 and bracket 9 to communicate the braking force of the track shoe 1 to the car truck 5.

The energization of the winding of the magnet track shoe 1 is controlled by a controller having a contact segment 11, and by a switch device 12 carried on the track shoe 1 by bracket 10 and provided with a switch contact member 13 mounted on a rod 14, one end of which engages within a bore 15 in the switch casing and the other end of which extends through a bore 16 in the other end of the switch casing and is connected by a link 17 to the upper end of a lever 18 that is pivotally mounted by a pin 19 to a bracket 20 that extends upwardly from the casing 21. The lower or bifurcated end of the lever 18 engages a pin 22 carried by a rod 23 that is slidably mounted in a bore 24 in the casing 21 and carries a collar 25, one side of which is engaged by spring 26 that extends from the left casing wall to the collar 25. The other side of the collar 25 engages the lower end of a lever 27 that is mounted on the casing 21 by the pivot pin 28, and the upper end 29 of which is adapted to engage a stop 31 that extends downwardly from the car truck 5. The rod 23 is urged toward the right by the spring 26 but is held in its illustrated position against the force of the spring by the lever 27 when the brake shoe is in its raised position.

A sliding member 32 is provided, the upper end of which extends through and is guided by a bore in a bracket 33 and the lower end of which extends through and is guided in a bore 35 in the lower wall of the casing 21. A slot 34 is provided therein to accommodate the rod 23 upon upward movement of the slidable member 32 upwardly from its illustrated position. The lower end of the slidable member 32 is connected by a pivot pin 36 to a connecting member 37, the lower end of which is connected by the pin 38 to a lever 39 that is mounted on the track shoe 1 by the pivot pin 41 and that is urged in its clockwise direction by a spring 42, the lower end of which is in engagement with the lever 39 at the point 43 and the upper end of which engages with a bracket 44 extending from the side of the track shoe 1. The clockwise movement of the lever 39 is limited by a stop 45 engaging the left hand end of the lever and mounted in a bracket 46 extending from the side of the track shoe 1. A rail engaging shoe 47 is carried at the right hand or lower end of the lever 39 for actuating it in a counterclockwise direction upon the lowering of the track shoe 1 into engagement with the track rail 2.

If the operator wishes to apply the brakes the controller is moved to bring the contact segment 11 into engagement with the contact members 56 and 57 to close a circuit from the overhead trolley conductor 53 through trolley 54, conductor 55, contact member 56, segment 11, contact member 57, conductor 58, the switch contact members 48, 13 and 49, conductor 59, the winding of the track shoe 1 to ground at 61, thus effecting full energization of the track shoe winding to insure a sufficient magnetic pull between the track shoe and the rail to cause the track shoe to move downwardly into engagement with the rail.

When the track shoe moves toward engagement with the rail the casing 21 is carried downwardly by the track shoe, thus permitting the upper end 29 of the lever 27 to disengage the stop 31 that is carried on the car truck 5, and relieving the force of the lower end of the lever 27 against the force of the spring 26 that has been exerted to retain the switch member 13 in its illustrated position. After the force of the lever 27 has been relieved the switch member 13 is maintained in its illustrated position for a short interval of time by engagement of the right hand end of the rod 23 with the slidable member 32.

As the track shoe 1 continues to move downwardly into engagement with the track rail the track engaging shoe 47 carried on the right end of the lever 39 causes the lever to be moved against the bias of the spring 42 thus forcing the link 37 and the slidable member 32 upwardly until the slot 34 therein registers with the end of the rod 23, permitting the spring 26 to force the rod 23 toward the right to actuate the lever 18 in a counterclockwise direction and bring the switch member 13 from engagement with the contact members 48 and 49 into engagement with the contact members 51 and 52. A circuit is thus closed extending from the overhead line conductor 53 through trolley 54, conductor 55, contact member 56, conducting segment 11, contact member 57, the resistor 62, conductor 63, switch contact members 51, 13 and 52, conductor 59, the winding of the track shoe magnet 1, to ground at 61, thus inserting the resistor 62 in series with the winding of the track shoe 1 to decrease the energization thereof to a minimum value. If the operator wishes a braking force corresponding to a greater degree of energization of the track shoe 1, the controller is moved to cause the conducting segment 11 to engage one or more of the contact members 63, 64 and 65 to cut portions of the resistor 62 from the circuit of the winding of the track shoe brake 1.

If the operator wishes to release the brakes the controller is moved to bring the segment 11 out of engagement with the contact members 56 and 57, that is, to its illustrated position, thus interrupting the circuit through the winding of the track shoe 1 and permitting the track shoe to be raised from engagement with the rail to its illustrated position by the springs 33 and 34. Upon upward movement of the track shoe 1 to its illustrated position the right hand end 29 of the lever 27 engages the stop 31 moving the lever 27 in a clockwise direction to cause the lower end thereof to force the collar 25 on the rod 23 toward the left against the bias of the spring 26 to move the lever 18 in a clockwise direction and the switch contact member 13 from engagement with the contact members 51 and 52 into engagement with the contact members 48 and 49, to again insure maximum initial energization of the winding of the track shoe 1 upon subsequent movement of the controller 11 to a brake applying position. As the rod 23 is moved by the lever 27 toward the left to its illustrated position, the right hand end thereof moves from the slot 34 in the slidable member 32, thus permitting the member 32 to be moved downwardly by the spring 42. This actuates the lever 39 in a clockwise direction until the left hand end thereof engages the stop 45 thus bringing the track engaging shoe 47 into proximity with the track rail 2 to be again operated as above described on a subsequent lowering of the track shoe 1 into engagement with the track rail 2.

It will be seen that my invention provides for initial maximum energization of the track shoe 1 to insure bringing the track shoe into engagement with the track rail 2, and that, upon movement of the track shoe into engagement with the track rail, the energization of the track shoe is automatically increased to its minimum value to thereby decrease the shock on the car effected upon engagement of the track shoe with the rail. This feature is very desirable under those conditions where an appreciable air gap is provided between the track shoe and the rail thus requiring a considerable magnetic force to effect the initial movement of the track shoe into engagement with the rail.

While one preferred embodiment of my invention has been illustrated and described it will be apparent to those skilled in the art that many modifications and changes in the apparatus and circuits illustrated may be made within the spirit of my invention and I do not wish to be limited otherwise than by the scope of the appended claims.

Having now described my invention, what I claim as new and desire to secure by Letters Patent, is:

1. In a brake equipment for vehicles, the combination with a spring suspended magnetic track shoe normally held above the track rail, of means for applying the brakes comprising means for initially effecting a maximum energization of said track shoe for bringing the track shoe toward the track rail by magnetic attraction and for decreasing the energization thereof to a minimum value in response to movement into engagement with the track rail.

2. In a brake equipment for vehicles, the combination with a spring suspended magnetic track shoe normally held above the track rail, of means for effecting application of the brakes comprising means for initially effecting a maximum energization of said track shoe for bringing the track shoe into engagement with the track rail by magnetic attraction, automatically decreasing the energization of the track shoe to a minimum value in response to movement thereof into engagement with the track rail, and for thereafter increasing the excitation thereof to produce the desired degree of braking.

3. In a brake equipment for vehicles, the combination with a spring suspended magnetic track shoe normally held above the track rail, of means for effecting application of the brakes comprising means for initially effecting the maximum energization of the track shoe for bringing the track shoe into engagement with the track rail by magnetic attraction, and automatic means responsive to movement of the track shoe into engagement with the track rail for reducing the energization of said track shoe to a minimum value.

4. In a brake equipment for vehicles, the combination with a spring suspended magnet track shoe normally held above the track rail, of manually operable means for controlling the brakes and effective upon movement to a brake applying position for closing a circuit for connecting said track shoe to a source of power, a resistor, means responsive to movement of said magnet track shoe into engagement with the track rail for connecting said resistor in circuit with said track shoe to decrease the energization thereof, and means subject to control by said manually operable means for cutting said resistor from said circuit to increase the energization of said track shoe to cause a desired degree of braking.

5. In a brake equipment for vehicles, in combination, a magnetic track shoe normally held above the track rail, means for controlling the brakes comprising a brake control resistor, manually operable means for connecting said track shoe to a source of power, means effective upon movement of the track shoe into engagement with the rail for connecting said control resistor in series with said track shoe, and controller means responsive to further movement of said manually operable means from its release position for progressively cutting sections of said resistor from series relation with said track shoe.

6. In a brake equipment for vehicles, in combination, a magnet track shoe normally held above the track rail, a manually operable controller operative upon movement to a brake applying position for connecting said track shoe to a source of power for causing movement of said track shoe into engagement with the track rail by magnetic attraction, a control resistor, switch means on said track shoe having two circuit closing positions and normally actuated to one circuit closing position for connecting said track shoe to said source of power independently of said resistor, means responsive to movement of said track shoe into engagement with said track rail for actuating said switch to its second circuit closing position for connecting said resistor in circuit with said track shoe, and means responsive to further movement of said controller from release position for cutting said resistance from the track shoe circuit.

7. In a brake equipment for vehicles, the combination with a spring suspended magnetic track shoe normally held above the track rail, of means for producing a relatively high degree of magnetic attraction between said track shoe and the rail when said track shoe is in its raised position, and means responsive to movement of said track shoe toward the rail for diminishing said magnetic attraction.

8. In a brake equipment for vehicles, the combination with a spring suspended magnetic track shoe normally held above the track rail, of means for producing a relatively high degree of magnetic attraction between said track shoe and the rail when said track shoe is in its raised position, means responsive to movement of said track shoe toward the rail for diminishing said magnetic attraction, and means for varying at will the magnetic attraction when said track shoe has engaged said rail.

9. In a brake equipment for vehicles, the combination with a magnetic track brake device adapted to be normally held above a track rail and to be attracted toward the rail upon supply of current thereto, of means for energizing said track brake device to produce a relatively high degree of magnetic attraction between said device and the rail when the device is in its raised position, and means operative in response to a predetermined movement of said device toward said rail for reducing the degree of energization of said device.

10. In a vehicle brake equipment, in combination, a magnetic track brake device adapted to be normally held above a track rail, means for causing said track brake device to move toward said track rail to produce an initial braking effect to a potentially high degree, and means responsive to movement of said device toward said rail and operative to cause the actual initial braking effect produced to be lower than said high degree.

11. In a vehicle brake equipment, in combination, a spring suspended magnetic track brake device normally held above a track rail and adapted to be attracted toward said rail upon energization thereof, means for energizing said track brake device to a chosen degree to cause it to move toward said rail, an element carried by said track brake device and being adapted to engage said rail ahead of said device, and means responsive to engagement of said element with said rail for decreasing the energization of said track brake device.

12. In a vehicle brake system, in combination, a spring suspended magnetic track brake device normally held above a track rail and adapted to be attracted toward said rail upon energization thereof, means for energizing said track brake device to a chosen degree to cause it to be attracted toward said rail, a switch device operative to effect a reduction in the degree of energization of said track brake device, and means including an element carried by said track brake device and adapted to engage said rail ahead of said track brake device for actuating said switch device.

13. In a vehicle brake system, in combination, a magnetic track brake device adapted to be suspended above a track rail and operable upon energization thereof to be attracted toward said rail, means for energizing said track brake device to a degree sufficient to cause it to move toward said rail, an element carried by said track brake device and being adapted to engage said rail ahead of engagement by said track brake device, switch means adapted to be operated upon engagement of said element with said rail, and means cooperating with said switch device for controlling the degree of energization of said track brake device.

JOSEPH C. McCUNE.